United States Patent

Lewis

[15] 3,686,712
[45] Aug. 29, 1972

[54] SHACKLE SUSPENSION MEANS
[72] Inventor: Ernest E. Lewis, Flowery Branch, Ga.
[73] Assignee: Gainesville Machine Company, Inc., Gainesville, Ga.
[22] Filed: Sept. 29, 1970
[21] Appl. No.: 76,527

[52] U.S. Cl. .......................................17/44.1, 17/11
[51] Int. Cl. ................................................A22c 21/00
[58] Field of Search ..........17/44.1, 11; 198/177, 179

[56] References Cited

UNITED STATES PATENTS

| | | | |
|---|---|---|---|
| 2,110,442 | 3/1938 | Kendall | 17/44.1 |
| 2,470,878 | 5/1949 | Tate | 17/44.3 UX |
| 3,263,270 | 8/1966 | Crawford et al. | 17/44.1 |
| 2,229,002 | 1/1941 | Cowey | 198/177 R X |
| 3,547,714 | 12/1970 | Freeman | 198/177 R |

Primary Examiner—Samuel Koren
Assistant Examiner—J. F. Pitrelli
Attorney—Newton, Hopkins & Ormsby

[57] ABSTRACT

This invention relates to an improved shackle suspension means for use in orienting a support shackle relative to a predetermined direction. More particularly, this invention is directed to a supporting shackle for supporting a chicken or other fowl by its hocks from a hock-gripping member with the fowl in a head lowermost position. The suspension system includes a mounting bracket supported for movement along a predetermined path for effecting a transfer of the supporting shackle through a poultry processing operation. The suspension bracket includes an angular offset orienting surface detailed to cooperate with a suspension element extending upwardly from the fowl supporting shackle to orient the supporting shackle operable position in a predetermined direction relative to the path of movement of the supporting bracket.

11 Claims, 3 Drawing Figures

PATENTED AUG 29 1972 3,686,712

INVENTOR.
ERNEST E. LEWIS
BY Newton, Hopkins & Ormsby
ATTORNEYS 3,686,712

SHACKLE SUSPENSION MEANS

BACKGROUND OF THE INVENTION

The present invention relates to the processing of poultry or other fowl in which the bird is supported by its hocks and oriented in a head lowermost position for movement through the poultry processing operation. In the movement of a supported bird through a poultry processing operation, it is important that the supported bird be oriented in a predetermined direction relative to various processing stations as it is moved through the processing operation.

There are numerous prior art poultry supporting shackles for use in moving poultry through a processing operation. However, the prior art devices do not include any means for orienting the supported fowl in a predetermined direction and it is necessary to provide manual means to properly orient the birds as they approach a processing station.

In a poultry processing plant the processing operation includes a number of processing stations such as means for stunning and killing poultry, means for picking and removing feathers from poultry and means for performing certain processing functions to the poultry after it has been properly cleaned. In these plants, the prior art poultry supporting shackles are complex in nature, uneconomical to manufacture and unreliable in operation.

SUMMARY OF THE INVENTION

Accordingly, it is a primary object of this invention to provide a suspension system for orienting a supporting shackle in a predetermined direction.

Another object of this invention is to provide an improved shackle suspension means wherein the suspension means is moveable along a predetermined path and wherein the supported shackle is oriented in a predetermined direction relative to the predetermined path.

A further object of this invention is to provide an improved supporting bracket for use in attaching a support shackle to an overhead conveying apparatus whereby the supported shackle will be oriented in a predetermined direction relative to the path of the conveying apparatus.

A still further object of this invention is to provide an improved shackle suspension means which includes orienting means for orienting the suspended shackle in a predetermined direction and wherein the orienting means is angularly settable to adjust the direction of orientation of the suspended shackle.

A still further object of this invention is to provide an improved shackle suspension means which is simple in construction, economical to manufacture and reliable in operation.

The foregoing and other objects are obtained by the use of a supporting bracket which extends downwardly from a moveable conveyor element. The supporting bracket includes an angular offset orienting surface having an opening extending therethrough. A fowl supporting shackle which is detailed to have an operable position includes an upwardly extending suspension element which extends through the opening in the angular offset bracket orienting surface. An orienting member is fixed to the upper extended end of the suspension element above the angular offset orienting surface. The orienting member is detailed to include a surface complementary to the orienting surface of the angular offset bracket and is operatively associated therewith whereby the suspension element and support shackle will be angularly rotatable relative to the supporting bracket to position the shackle operable position in a predetermined direction relative to the path of movement of the conveying apparatus. The orienting member and suspension element includes adjusted means for angularly setting the orienting member whereby the operable position of the supported shackle can be angularly adjusted relative to the path of movement of the conveying apparatus.

Various other objects and advantages in the details of construction will become apparent after reading the following description of one illustrative embodiment of the invention with reference to the accompanying drawings wherein like reference numerals designate like or corresponding parts throughout the several views and wherein:

BRIEF DESCRIPTIONS OF THE DRAWINGS

DESCRIPTION OF AN ILLUSTRATIVE EMBODIMENT

Figure 1:
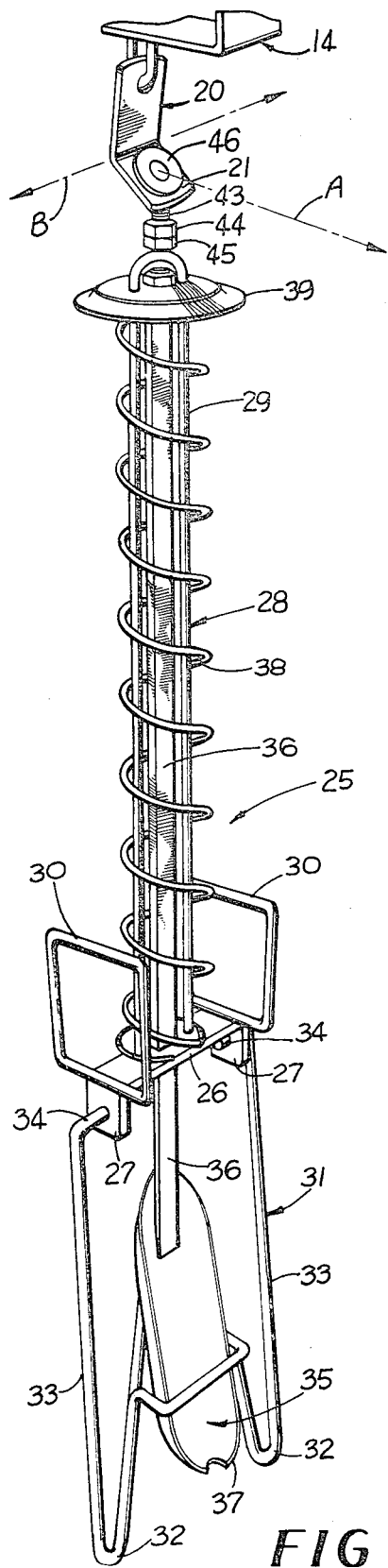
FIG. 1 is a perspective view of the improved shackle suspension means.

Referring to the drawings, the improved shackle suspension means will be described with reference to an overhead supporting member 10, a conveyor supporting bracket 14, an orienting bracket 20 and shackle support element 25 having an orienting member 46.

Figure 2:
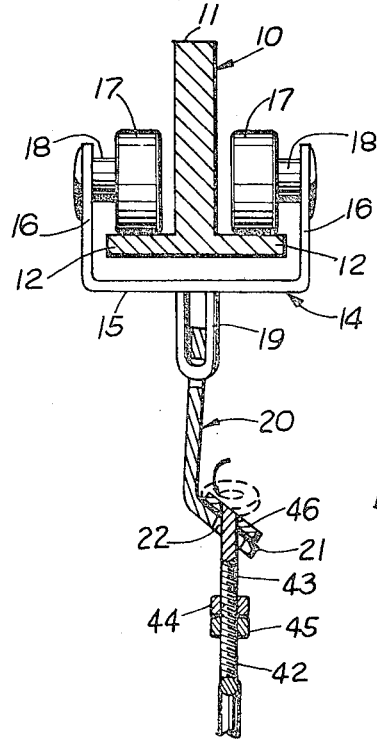
FIG. 2 is a fragmentary enlarged vertical sectional view of the improved shackle suspension means.

As shown in FIG. 2, the overhead conveyor supporting member 10 includes an upstanding beam 11 having two laterally and oppositely projecting track portions 12. A conveying bracket 14 is supported for movement along the conveyor support element 10. The conveyor bracket is substantially U-shaped and includes a base portion 15 having two upwardly extending legs 16. Each of the upwardly extending legs 16 has a roller element 17 rotatably supported thereon by a stud shaft 18 connected to the upstanding legs and detailed for supporting the rollers 17 in rolling engagement with the upper surface of lateral extending tracks 12. The conveyor support bracket 14 is detailed for moving a supporting shackle 25 in a predetermined path along the supporting beam 11. The above described conveyor support mechanism is similar in construction to the conveyor system disclosed in co-pending application Ser. No. 35,672 filed May 8, 1970 and reference is made to the co-pending application for the details of construction of a conveying system utilizing the above described conveyor support bracket.

The conveyor support bracket 14 includes a downwardly extending link 19 having an orienting bracket 20 pivotally supported therefrom as shown in FIGS. 1 and 2. Bracket 20 is detailed to include an angular offset orienting surface 21 which has a vertically extended opening 22 extending thereto for supporting a poultry supporting shackle. The operation of the orienting surface 21 will be described in more detail herein below.

As shown in FIG. 1, the supporting bracket 20 is detailed for supporting a shackle member generally indicated by the reference 25 and detailed for supporting a chicken or other fowl. The shackle member 25 comprises a centrally located substantially U-shaped bracket 26 having an elongated base and normally downwardly pointed legs 27. A second U-shaped support bracket 28, the elongated legs 29 of which also point downwardly are secured at the ends thereof to the upper surface of the base of bracket 26, by welding or the like. A pair of rod-like structures or guides 30 bent substantially into the configuration of squares are attached along opposite sides of the upper surface of the base of the bracket 26 outside the connections of legs 29 and along the edges from which the legs 27 extend, also by welding or the like, and are disposed thereon such that the guides 30 are substantially perpendicular to base 26. Pivotally disposed on the bracket 26 is a support 31 for a chicken or other fowl. Support 31 is disposed below the bracket 26 and includes a pair of U-shaped hock-gripping elements 32 in which the hocks of the chicken or other fowl may be compressed or clamped whereby the bird may be suspended therefrom in a head lowermost position. Rod-like extensions 33 extend upwardly from hock-gripping elements 32 and are substantially parallel to legs 27 of the bracket 26. Extensions 33 are provided with short right-angled projections 34 which pass through apertures in the legs 27 and thereby provide pivotal movement of the support 31 and of the chicken and other fowl suspended therefrom.

The illustrative embodiment of a shackle support includes a viscera removeable tool generally indicated by the reference numeral 35 and comprises an elongated arm 36 to one end of which is secured a spoon-shaped viscera removal member 37. The other end of arm 36 passes through an aperture centrally disposed in the base of U-shaped bracket 26 between the points of connection thereto of legs 29 of the shackle support element 28. A coil spring 38 is positioned about arm 36 and legs 29 of support 28 and is compressed against the base of the bracket 26 by an inverted substantially saucer-shaped member 39 having a diametrical slot therein through which are received the U-shaped support legs 29 and a threaded end of arm 36. A bolt 40 is secured to the threaded end of arm 36 for maintaining the saucer-shaped member 39 thereon.

A support shackle of the present invention is similar in construction to a shackle eviscerating tool disclosed in applicant's co-pending application Ser. No. 883,201 filed Dec. 8, 1969 and reference is made to the co-pending application for the details of construction and operation of the supporting shackle.

The supporting shackle of the present invention is provided with an operable position extending in the direction of arrow A shown in FIG. 1. The operable direction of the shackle 25 and arrow A is substantially perpendicular to a conveying path of direction indicated generally by arrows B.

The supporting shackle 25 is oriented in a conveying operation whereby the shackle operable position will be automatically positioned substantially as shown in FIG. 1.

Figure 3:
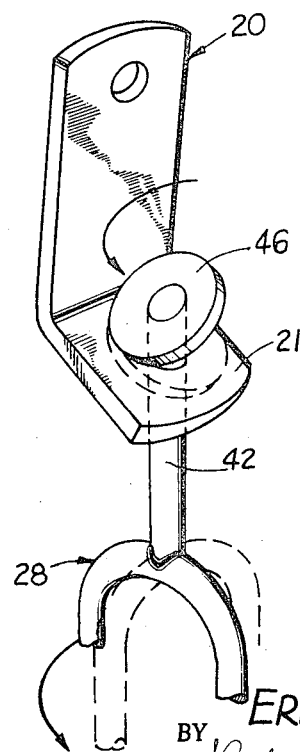
FIG. 3 is an enlarged fragmentary perspective view illustrating the angular orientation operation of the support bracket and suspension member.

The improved support shackle suspension means includes an upwardly extended threaded element 42 fixed to U-shaped member 29 in substantially coplanar relationship therewith. The threaded member 42 is angularly adjustable to a set position relative to a second threaded member 43 which is locked in a desired set position relative to member 42 by means of a pair of locking nuts 44, 45, which adjustment is made prior to a poultry processing operation. The locking nuts 44, 45 are secured to each other by a conventional means, such as welding. As shown in FIGS. 2 and 3, threaded element 43 extends upwardly through opening 22 of the orienting bracket 20. An orienting member 46 is secured to the upper extended end of member 43, by conventional means such as welding. The orienting member 46 is detailed to be fixed in an angular set position relative to element 43 whereby orienting member 46 is substantially complementary in angular relationship relative to the oriented surface 21 when the member 46 is rotated to a position as shown in FIG. 2.

In an operating position, the orienting member 46 and threaded element 43 are angularly adjusted within locking bolts 44 and 45 whereby the orienting member 46 will be complementary to surface 21 when the support shackle is in an operable oriented position substantially as shown in FIG. 1. Should it become necessary to adjust the operable position of the supporting shackle 25 relative to the path of travel of the conveying apparatus, the two threaded elements 42 and 43 are merely adjusted relative to each other and are locked together in a desired set position by means by the locking nuts 44, 45.

As shown in FIG. 3, the support shackle including orienting member 46 is rotatable within the opening 22 of supporting bracket 20. However, the weight of the supporting shackle will effect an automatic rotation of the supporting shackle to position the orienting member in complementary relationship relative to the orienting surface 21 of support bracket 20. Therefore, should the support bracket 25 become angularly rotated within support bracket 20 during a conveying operation, the supporting shackle 25 will automatically rotate to again position the orienting member 46 in the complementary relationship relative to the surface 21.

The illustrative embodiment of the orienting members of the shackle suspension system includes a flat angular offset surface provided on the supporting bracket 20 and a flat disc-shaped member 46 angularly positioned on the upper extended end of the support shackle suspension element 43. However, various modifications in the shape and form of the support bracket 20 and oriented member 46 can be made which will provide the desired automatic angular rotation of the support shackle, to position the operable position of the support shackle in a predetermined direction relative to the path of travel of the conveying apparatus.

It now becomes apparent that the above described illustrative embodiment of the improved shackle suspension means is capable of obtaining the above stated objects and advantages. It is obvious that those skilled in the art may make modifications in the details of construction without departing from the spirit of the invention which is to be limited only by the scope of the appended claims.

What is claimed is:

1. In an improved shackle suspension means for use in orienting a support shackle relative to a predetermined direction comprising, in combination:
   a. a support shackle including an upwardly extended element, said shackle detailed to include an operable position;
   b. a suspension bracket; and,
   c. means for suspending said support shackle from said suspension bracket, said suspending means including means for orienting said support shackle to position said shackle operable position in a predetermined direction, said orienting means including a first formed orienting surface on said suspension bracket and a second formed orienting surface on said upwardly extended element, said first surface forming an angle with said second surface when said shackle is out of said predetermined direction, said surfaces lying parallel to each other and forming an oblique angle with the axis of said suspension means when the shackle is in said predetermined direction, and wherein said first formed orienting surface is detailed in operative association with said second formed orienting surface so that said support shackle will be automatically oriented to position said operable position in said predetermined direction.

2. In an improved shackle suspension means as described in claim 1 further characterized in that said suspension bracket is mounted for movement along a predetermined path and wherein said oriented means is detailed to orient said shackle operable position in a predetermined direction relative to said predetermined path.

3. In an improved shackle suspension means as described in claim 2 further characterized in that said oriented means is detailed to orient said shackle operable position at substantially right angles relative to said predetermined path.

4. In an improved shackle suspension means as described in claim 1 further characterized in that said suspension bracket includes a detailed shaped orienting surface having an opening extending therethrough and wherein said support shackle includes a suspending element extending through said opening, and wherein a detailed shaped orienting surface fixed to the extended end of said shackle support element and operatively associated with said bracket orienting surface whereby said support shackle operable position will be automatically oriented relative to said predetermined direction.

5. In an improved shackle suspension means as described in claim 1 further characterized in that said bracket includes an angular offset orienting surface provided with an opening extending therethrough, said supporting shackle including a support element extending through said opening, an orienting member fixed to said support element, said orienting member being detailed in angular position relative to said support element to be in substantially complementary orientation relative to said angular offset orienting surface operatively associated therewith for orienting said support shackle operable position in said predetermined direction.

6. In an improved shackle suspension means as described in claim 1 further characterized in that said orienting means is selectively settable relative to said suspension bracket whereby said predetermined direction of said support shackle operable position can be angularly adjusted.

7. In an improved shackle suspension means as described in claim 6 further characterized in that said suspension bracket includes an angular offset orienting surface provided with an opening extending therethrough, said shackle suspending means including a suspending element extending upwardly through said support bracket opening, and oriented member mounted on said suspending element above said support bracket angular offset orienting surface, said orienting member being detailed in design and operatively associated with said bracket orienting surface whereby said shackle operable position will be automatically oriented relative to a predetermined direction and wherein said selectively settable means includes means for angularly adjusting said suspending element relative to the operable position of said support shackle.

8. In an improved shackle suspension means for use in orienting a support shackle relative to a predetermined direction comprising, in combination:
   a. a suspension bracket;
   b. means mounting said suspension bracket for movement along a predetermined path, said suspension bracket being suspended below said bracket mounting means and including a vertical portion and an oblique plate portion forming an angular offset orienting surface having an opening formed therein;
   c. a support shackle, said shackle detailed to include an operable position; and,
   d. a suspension element connected to said support shackle and including an extended portion extending upwardly through said opening in said suspension bracket offset orienting surface and wherein said extended portion includes an orienting member fixed thereto adjacent said bracket orienting surface with said orienting member having an oblique surface operatively associated with said bracket orienting surface for automatically orienting through rotation the operable position of said support shackle to predetermined direction relative to said predetermined path.

9. In an improved shackle suspension means as described in claim 8 further characterized in that said predetermined direction is oriented substantially 90° relative said predetermined path.

10. In an improved shackle suspension system for use in orienting a fowl supporting shackle relative to a predetermined direction comprising, in combination:
    a. a supporting shackle, said supporting shackle detailed to include means to suspend a fowl by its hock and wherein the fowl supporting means is detailed to include an operable position whereby the fowl can be moved through a processing operation with the fowl operable position oriented in a predetermined direction;
    b. a suspension bracket;
    c. means for supporting said suspension bracket for movement along a predetermined path; and,
    d. means for suspending said fowl supporting shackle from said suspension bracket for movement therewith along said predetermined path, said supporting shackle being angularly adjustable about a vertical axis relative to said suspension bracket and wherein said suspending means includes means for automatically orienting said fowl supporting shackle and said supported fowl to position said shackle operable position in said predetermined direction relative to said predetermined path.

11. In an improved shackle suspension means as described in claim 10 further characterized in that said supporting shackle includes means for supporting said fowl in a head lowermost position and wherein said predetermined direction of said operable position is detailed to be substantially 90° relative to said predetermined path.

* * * * *